United States Patent
Henry

(10) Patent No.: US 9,880,535 B2
(45) Date of Patent: *Jan. 30, 2018

(54) SYSTEM AND METHOD FOR AIR CART AND ROTARY AIR LOCK

(71) Applicant: CNH Industrial Canada, Ltd., Saskatoon (CA)

(72) Inventor: Jim Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 102 days.

This patent is subject to a terminal disclaimer.

(21) Appl. No.: 14/557,908

(22) Filed: Dec. 2, 2014

(65) Prior Publication Data
US 2016/0152424 A1 Jun. 2, 2016

(51) Int. Cl.
| | | |
|---|---|---|
| *A01C 7/08* | (2006.01) | |
| *A01C 7/10* | (2006.01) | |
| *B65G 53/46* | (2006.01) | |
| *G05B 15/02* | (2006.01) | |
| *G01S 19/13* | (2010.01) | |
| *A01C 15/00* | (2006.01) | |
| *A01B 69/04* | (2006.01) | |

(52) U.S. Cl.
CPC .............. *G05B 15/02* (2013.01); *A01C 7/081* (2013.01); *A01C 7/102* (2013.01); *A01C 15/003* (2013.01); *B65G 53/4633* (2013.01); *G01S 19/13* (2013.01); *A01B 69/008* (2013.01); *A01C 15/006* (2013.01)

(58) Field of Classification Search
USPC ........................................................ 701/50
See application file for complete search history.

(56) References Cited

U.S. PATENT DOCUMENTS

| | | | | |
|---|---|---|---|---|
| 2,643,159 A | * | 6/1953 | Brackett ................ | B65G 53/00 406/105 |
| 4,575,284 A | * | 3/1986 | Kelm ..................... | A01C 7/082 111/34 |
| 5,109,893 A | | 5/1992 | Derby | |
| 5,324,143 A | * | 6/1994 | Sanders ............. | B65G 53/4633 406/67 |
| 5,567,457 A | * | 10/1996 | Martinek .............. | A23L 1/1648 34/92 |
| 5,684,476 A | | 11/1997 | Anderson | |

(Continued)

FOREIGN PATENT DOCUMENTS

EP 2130422 A1 12/2009

OTHER PUBLICATIONS

Kinze Autonomous Harvest System; http://www.agweb.com/article/update_on_kinze_autonomous_harvest_system_/; AgWeb article; 2012.

*Primary Examiner* — Alicia Torres
(74) *Attorney, Agent, or Firm* — Rebecca L. Henkel; Rickard K. DeMille

(57) ABSTRACT

An agricultural product delivery system and method is provided. The agricultural product delivery system includes a feeder for receiving particulate materials and a storage tank for holding particulate materials. A control system controls a filling system for providing particulate materials to the feeder. The control system is configured to communicate with a filling system to substantially maintain an alignment between the filling system and the feeder.

16 Claims, 5 Drawing Sheets

(56) References Cited

U.S. PATENT DOCUMENTS

| | | |
|---|---|---|
| 6,289,830 B2 | 9/2001 | Mayerle et al. |
| 6,669,411 B2 | 12/2003 | Salley, Jr. |
| 6,708,631 B1 | 3/2004 | McQuinn et al. |
| 6,776,557 B2 | 8/2004 | Barnet et al. |
| 7,503,510 B2 | 3/2009 | Vickers et al. |
| 7,640,876 B2 | 1/2010 | Memory |
| 8,234,987 B2 | 8/2012 | Georgison et al. |
| 8,344,897 B2 | 1/2013 | Peterson et al. |
| 8,380,401 B2 | 2/2013 | Pighi et al. |
| 2007/0052187 A1 | 3/2007 | Browder |
| 2007/0262179 A1 | 11/2007 | Larsen et al. |
| 2010/0017073 A1* | 1/2010 | Landphair ............. A01C 7/081 701/50 |
| 2010/0332051 A1* | 12/2010 | Kormann ............... A01F 12/46 701/2 |
| 2012/0215381 A1 | 8/2012 | Wang et al. |
| 2013/0022433 A1* | 1/2013 | Anderson ............. A01D 90/02 414/467 |

\* cited by examiner

SYSTEM AND METHOD FOR AIR CART AND ROTARY AIR LOCK

FIELD OF THE INVENTION

The invention relates generally to agriculture, and in particular, to systems and methods for loading agricultural products.

BACKGROUND OF THE INVENTION

Efficiently delivering agricultural products, such as seeds and fertilizer, to the ground in large areas typically requires a variety of machinery. A tractor may be used to push or pull a ground engaging tool, such as seeder or other planting device, for evenly distributing the agricultural products using a pressurized seed or fertilizer delivery system. The ground engaging tool may, in turn, receive a steady supply of the agricultural products from a pressurized air cart or other storage element that is also typically being pushed or pulled by the tractor.

In agricultural operations, it is desirable to minimize the amount of downtime as much as possible. For delivering agricultural products, this often means using an air cart or other storage element with ever increasing volumes for holding the agricultural products. For example, modern air carts may have a capacity over 500 bushels, thereby allowing even longer operating times.

However, towing an air cart that is too large throughout a field requires significant horsepower which results in inefficiency. On the other hand, having an air cart that is not large enough can save horsepower, but require more costly downtime. For example, it could require at least 30 minutes for filling exceptionally large tanks. In addition, filling typically requires stopping the air cart, bringing a supply vehicle nearby, moving a loading auger into position, starting hydraulics to drive the auger to fill the air cart, verifying correct loading amounts, and re-securing the system to resume field operation, at the point they were stopped. This is lost time that could be used for greater productivity in the field.

What is needed is a technique for keeping an air cart full and in operation for as long as possible while minimizing the amount of downtime.

SUMMARY OF THE INVENTION

This present inventors have recognized that a master/slave approach using Vehicle-to-Vehicle Control (V2V) operation could be implemented to keep an air cart or other storage element full and in operation. When an air cart system and a supply vehicle come into an "active zone," V2V can give control to the air cart system (or the air cart system could give control to the supply vehicle) to dictate at least one of a forward speed, a vehicle alignment and a direction of travel of the supply vehicle (or the air cart system). It could also control data exchange between the systems/vehicles. Accordingly, V2V may allow for precise control of loading operations and may reduce the risk of collisions in the field.

Accordingly, embodiments of the invention may provide a system and method for filling air carts or other storage elements with an agricultural product while "on-the-go," On-the-go filling means that while filling the air cart with an agricultural product, an implement can continue in motion and deliver an agricultural product into the ground via ground engaging tools without stopping.

In embodiments, two systems may be involved in the on-the-go filling process: (a) an air seeding system, which could comprise a tractor, an air seeder and/or an air cart, and (b) a filling system or supply vehicle, which may comprise a tractor or truck, and a trailer or tank which may be front mounted tank. The trailer or tank will be filled with the agricultural product to be delivered to the air seeding system. The Filling system may be summoned, and may then come to the air seeding system. Once in position, such as behind the an cart, the filling system may take the same speed as the an seeding system. The two systems may then connect, and product may be transferred from the filling system to the seeding system. Once filling is complete, the systems may disconnect, and the filling system may move away from the air seeding system to await the next filling operation.

There are many possible variations for mechanisms to facilitate keeping an air cart full and in operation within the spirit of the present invention, including as described in a co-pending U.S. patent application Ser. No. 14/558,033, filed Dec. 2, 2014, assigned to the common assignee of the instant application, which document is incorporated herein by reference in its entirety. For example, air carts may have an air lock system, which may be a rotary air lock, and which may ensure a pressure suitable for field operation is substantially maintained in the storage tank of the an cart.

According to another embodiment, a system for filling a pressurized tank of an air cart or other storage element while it is operating (in motion) to deliver an agricultural product to ground engaging tools, such as for seeding or fertilizer placement, may be provided. The air cart system may control the speed and direction of a supply unit and unloading auger by way of a V2V operation, A control system ensures the unloading/conveyor/filling system or auger maintains a position directly over a feeder. While the filling system is unloading, an air lock moves the agricultural product from the feeder into a pressurized tank. The air lock provides a mechanism for inputting an agricultural product into the tank while substantially maintaining a pressure needed for continuous field operations.

U.S. Pat. No. 8,606,454, titled "System and method for synchronized control of a harvester and transport vehicle," assigned to the present assignee and incorporated herein by reference in its entirety, discloses a control system and method for synchronized control of a harvester and transport vehicle during unload on the go operation. The control system can maintain a desired lateral distance between the harvester and transport vehicle using swath information that is used to steer the harvester. In addition, the control system can also bring a transport vehicle into appropriate alignment with the harvester using the same swath information.

The present inventors have recognized that a control system and method may be similarly provided for synchronized control of an agricultural product delivery system and supply vehicle for a load on the go operation. Accordingly, a control system can maintain a desired lateral distance between an air cart, or other storage element, and supply vehicle using swath information that is used to steer the supply vehicle. In addition, the control, system can also bring the supply vehicle into appropriate alignment with the air cart or storage element using the same swath information.

In the preferred embodiment, the air lock may be a rotary air lock. Also, the air lock may be part of the tank lid in order to maintain the ability for visual inspection of storage tanks and the possibility for filling manually/conventionally. In addition, a supply unit could have more than one compartment and auger, and an air cart or storage element could have more than one storage tank. As a result, multiple tanks could be filled sequentially or simultaneously.

According to one aspect of the invention, an agricultural product delivery system may comprise: An agricultural product delivery system comprising: a feeder for receiving particulate materials from a separately operated filling system; a storage tank for holding the particulate materials and a control system for controlling the filling system providing the particulate materials to the feeder. The control system may be configured to communicate with the filling system to substantially maintain an alignment between the filling system and the feeder.

Another aspect may provide a method for filling an agricultural product delivery system. The method may comprise: (a) receiving particulate materials at a feeder from a separately operated filling system; (b) holding the particulate materials in a storage tank, and (c) communicating with and electronically controlling the filling system providing the particulate materials to the feeder to substantially maintain an alignment between the filling system and the feeder.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
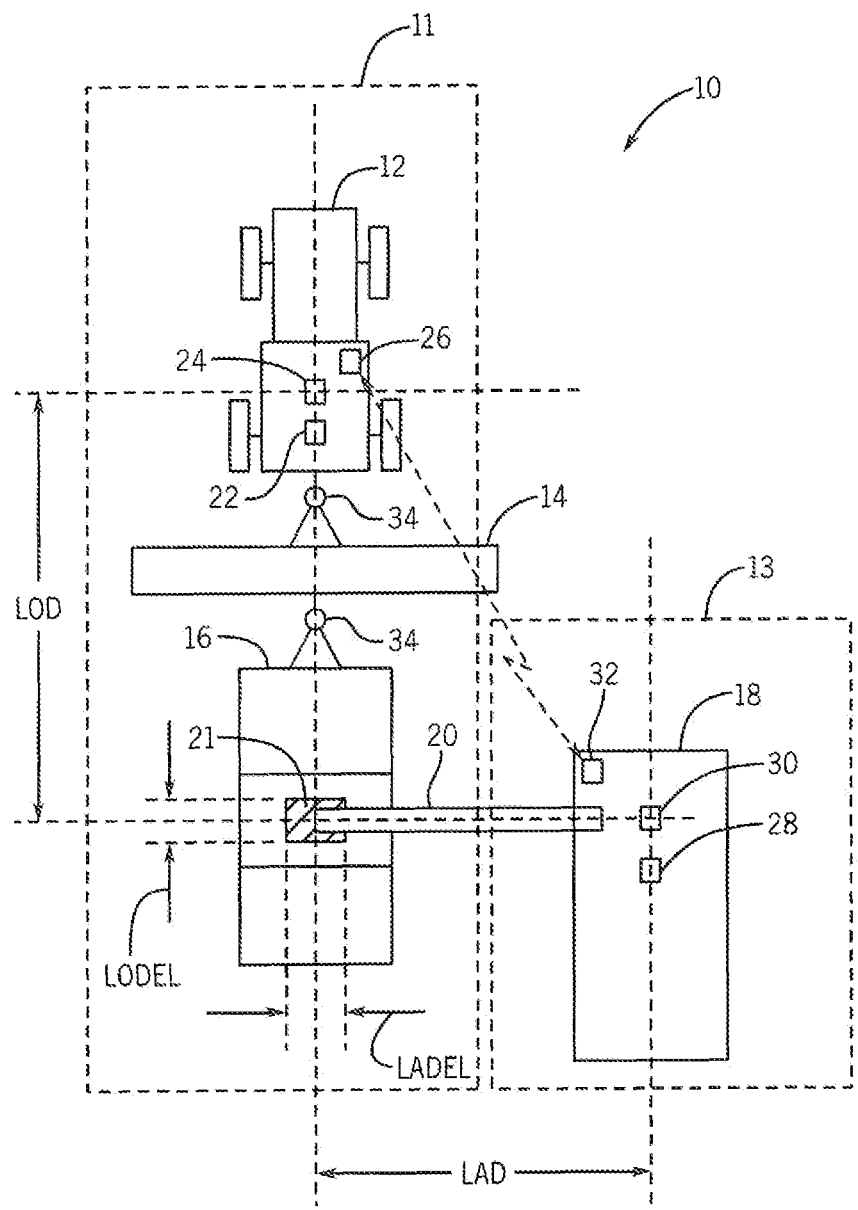
FIG. 1 is a diagram of an exemplar agricultural system in accordance with an embodiment of the present invention.

Referring now to the drawings and specifically to FIG. 1, aspects of the present invention will now be described by way of an exemplar agricultural system 10 in accordance with an embodiment of the present invention. The agricultural system 10 may include an agricultural product delivery system 11, which could include one or more of a tractor, truck or other self-propelled vehicle 12, pulling a ground engaging tool 14, which could be a seeder or other planting device, and pulling an air cart or other storage element 16. It will be appreciated that one or more elements of the agricultural product delivery system 11 could be integrated while keeping within the spirit of the present invention. For example, the ground engaging tool 14 and the air cart 16 could be integrated together, and/or the air cart 16 could be self-propelled. Also the tractor 12 could alternatively be pushing the ground engaging tool 14 and/or the air cart 16, The agricultural system 10 also includes a separately operated conveyor or filling system 13 for providing an agricultural product in the form of particulate materials, such as seed or fertilizer, to the agricultural product delivery system. The filling system 13 could include one or more of a supply vehicle 18 and an auger conveyor 20 or other conveyor. The supply vehicle 18, which could be a truck, may drive alongside the air cart 16 to unload the particulate materials to the air cart 16, which holds particulate materials, via the auger conveyor 20. The auger conveyor 20 may be a screw-type conveyor for lifting the particulate materials from the supply vehicle 18 to the air cart 16, though other conveyor systems known in the art could be used. The agricultural product delivery system 11 and the filling system 13 are configured for vehicle to vehicle (V2V) operation substantially as described in U.S. Pat. No. 8,606,454, incorporated herein by reference in its entirety.

In an exemplary embodiment, the tractor 12 and the supply vehicle 18 can be controlled by a global positioning system (GPS) based auto-guidance control system(s) in order to maintain a desired lateral distance (LAD) and a desired longitudinal distance (LOD) between the supply vehicle 18 and the air cart 16 (towed by the tractor 12). One exemplary embodiment of the reference points used for measuring the desired lateral distance and desired longitudinal distance is shown in FIG. 1. However, any suitable reference points for measuring lateral distance and longitudinal distance can be used. The desired lateral distance and desired longitudinal distance can both be a preselected distances plus or minus a predetermined offset that ensures that the particulate materials provided by the supply vehicle 18 are received and stored by the air cart 16. As shown in FIG. 1, the lateral distance error limits (LADEL) define the maximum and minimum lateral distances that can be used for load on the go operation. Similarly, the longitudinal distance error limits (LODEL) define the maximum and minimum longitudinal distances that can be used for load on the go operation. The preselected lateral and longitudinal distances and the corresponding predetermined offsets can be related to the particular air carts and filling systems being used, specifically the size of a feeder 21 area for the air cart 16 and an estimate of the shoot-out distance or pattern of the particulate materials from the auger conveyor 20 to the air cart 16. Accordingly, alignment between the filling system, such as the auger conveyor 20, and the feeder 21 may be substantially maintained while the agricultural product delivery system 11 is in motion.

The tractor 12 can have: a controller 22 that includes a display unit or user interface and a navigation controller; a GPS device 24 that includes an antenna and receiver; and a wireless communication unit or device (WCU) 26 that can include a power control switch. Similarly, the supply vehicle 18 can have: a controller 28 that can include a display unit or user interface, a navigation controller and tractor vehicle to vehicle control unit (TV2V); a GPS device 30 that can include an antenna and receiver; and a wireless communication unit or device (WCU) 32 that can include a power control switch. The controllers can be used to control operation and/or steering of the supply vehicle 18 and/or air cart 16 (via the tractor 12), regardless of the machine in which the controller may be installed. The GPS device can be used to determine the position of the supply vehicle 18 or air cart 16 and the wireless communication device can be used to send and receive information, data and control signals between the supply vehicle 18 and the air cart 16. Also, hitch angle sensors 34 could be used to determine the relative angles or hitch angles between the tractor 12, the ground engaging tool 14 and the air cart 16.

Figure 2:
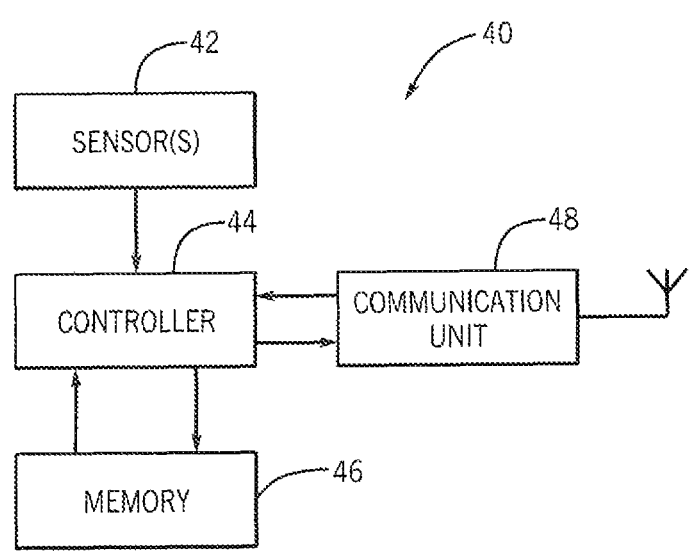
FIG. 2 is a block diagram illustrating a control system for use with an agricultural system in accordance with an embodiment of the present invention

Referring now to FIG. 2, a block diagram illustrating a control system 40 for use with the agricultural system 10 is provided in accordance with an embodiment of the present invention. In an embodiment, the control system 40 may be implemented in the agricultural product delivery system, such as in the tractor 12 (towing the air cart 16), or in the air cart 16, for substantially maintaining an alignment between the filling system, such as the supply vehicle 18 and/or the auger conveyor 20, and the feeder 21, Alternatively, the control system 40 could be implemented in the filling system 13 for substantially maintaining such alignment.

The control system 40 includes one or more sensors 42 communicating sensed data to a controller 44. The sensors 42 may include one or more of GPS sensors, hitch sensors, gyroscopes, accelerometers, and so forth. The controller 44 may be a microcontroller, microprocessor or other processing logic capable of executing a program stored in a non-transient computer readable medium. The controller 44 may be in communication with a memory 46, which may be a non-volatile reprogrammable memory, such as Flash memory. The memory 46 may store the program executed by the controller 44. and/or more store other parameters related to the determinations of LAD, LOD, LADEL as discussed above, The controller 44 is also in communication with a wireless communication unit 48 for communicating with the other system in the agricultural system 10.

By way of example, in operation with the control system 40 implemented in the agricultural product delivery system, such as the tractor 12, the control system 40 may operate to control the filling system, such as the auger conveyor 20, to substantially maintain an alignment between the feeder 21 of the air cart 16 and the auger conveyor 20 of the supply vehicle 18. The controller 44 may sense a GPS location of the tractor 12 and hitch angle sensors of the ground engaging tool 14 and the air cart 16 in tow, and determine a position of the feeder 21 using distance/dimension parameters held in the memory 46. The controller 44 may also receive a GPS location of the supply vehicle 18 and/or the auger conveyor 20 via the wireless communication unit 48. Accordingly, the controller 44 may execute to determine a position and speed for the supply vehicle 18 that is sufficient to substantially maintain an alignment between the feeder 21 and the auger conveyor 20. The controller 44 may then wirelessly communicate such information to the supply vehicle 18, and, upon confirmation that each system is ready for loading, the controller 44 may signal or otherwise allow the particulate materials to be loaded to the air cart 16 from the supply vehicle 18. Other data exchanges between the agricultural product delivery system 11 and the filling system 13 can also be provided Conversely, the control system 40 could similarly be implemented in the supply vehicle 18. For example, in this case, the controller 44 would sense a GPS location of the supply vehicle 18 and/or the auger conveyor 20, and receive a GPS location of the tractor 12 and hitch angle sensors of the ground engaging tool 14 and the air cart 16 in tow via the wireless communication unit 48. Accordingly, the controller 44 would execute to determine a position and speed for the tractor 12 that is sufficient to substantially maintain an alignment between the auger conveyor 20 and the feeder 21. The controller 44 may then wirelessly communicate such information to the tractor 12, and, upon confirmation that each system is ready for loading, the controller 44 may signal or otherwise allow the particulate materials to be loaded to the an cart 16 from the supply vehicle 18.

Accordingly, a method is provided for loading an agricultural product, such as seed, fertilizer or other particulate materials, to the agricultural product delivery system 11 during field operations. The feeder 21, such as on the air cart 16, receives the particulate materials from the filling system 13 while in motion. Using an air lock, the particulate materials are transferred from the feeder 21 to a storage tank of the air cart 16 for holding the particulate materials. The air lock transfers the particulate materials while substantially maintaining a pressure in the storage tank to permit ongoing field operations. In addition, the air lock may be used to measure the volume of particulate materials (or product) going to the storage tank of the air cart 16. For example, a number of revolutions or other actuations of the air lock may be counted, such as by a Hall effect sensor and/or similar sensing hardware, and calculated by the controller 44 to determine a corresponding amount of product transferred. Also, a V2V system permits electronic sensing and control to substantially maintain an alignment between the filling system 13 and the feeder 21 while the agricultural product delivery system 11 is in motion.

Figure 3:
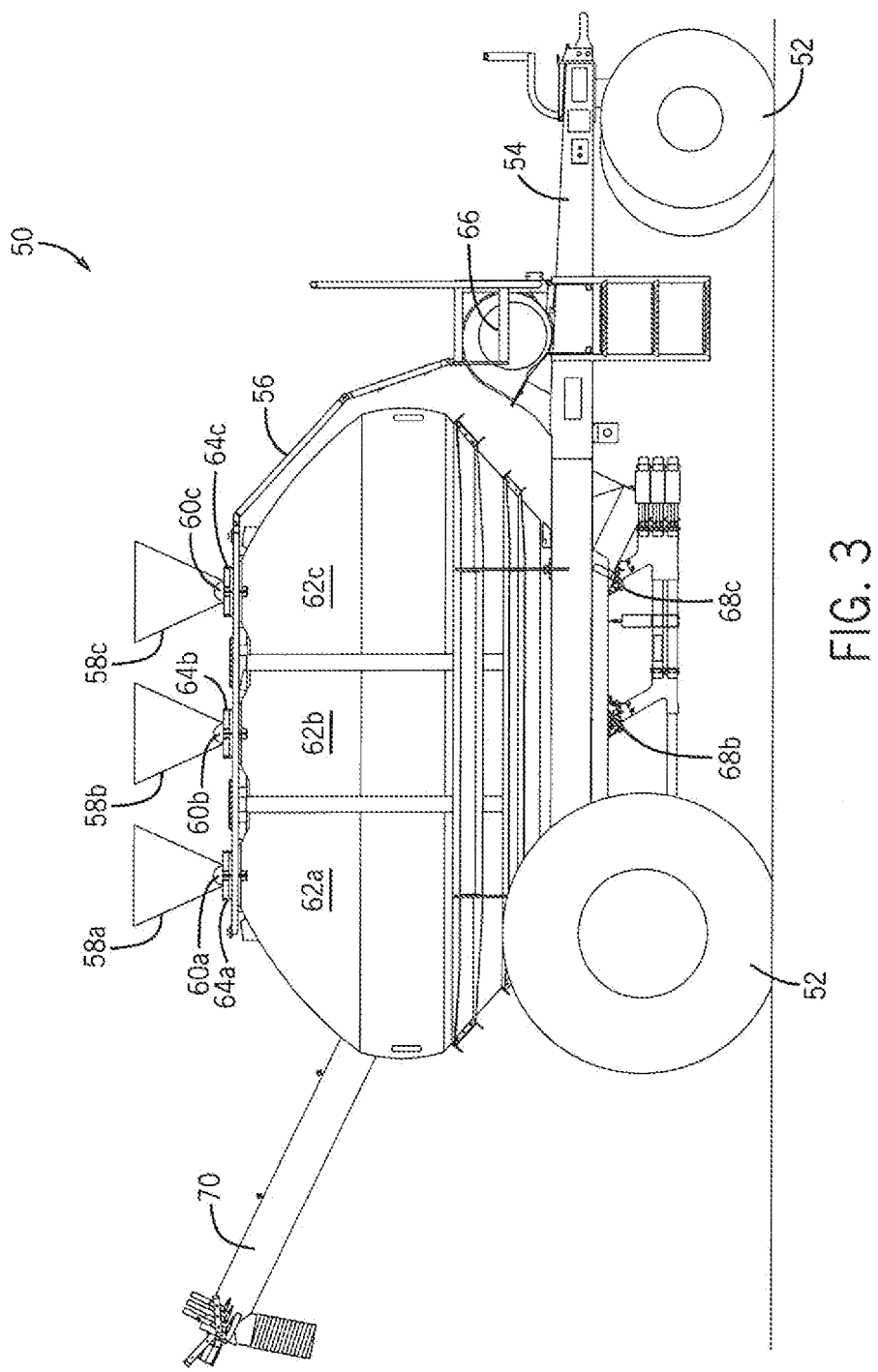
FIG. 3 is a side view of an air cart which may be part of an agricultural product delivery system in accordance with an embodiment of the present invention.

Referring now to FIG. 3, a side view of an air cart 50, which may be part of an agricultural product delivery system, is provided in accordance with an embodiment of the present invention. The air cart 50 may include wheels 52 supporting a chassis 54 and a body 56 for towing behind a tractor, a seeder or other implement. Alternatively, the air cart 50 could be configured to be pushed or self-propelled.

One or more feeders 58a-58c are disposed over the body. The feeders 58a-58c are configured to receive particulate materials, and could be, for example, hoppers having a wider area opening above for catching the particulate materials, and a narrowing opening below for funneling the particulate materials. Below each of the feeders 58a-58c is a respective air lock 60. The air lock 60 is operable to transfer the particulate materials from the feeders 58a-58c to a respective storage tank 62, disposed below the air lock 60, while substantially maintaining a pressure in the storage tank 62. The air lock 60 may also include sensing hardware, such as a Hall effect sensor, to measure the volume of particulate materials (or product) going to the storage tank 62. By way of example, the storage tank 62 may be a single storage tank, which may have capacity over 500 bushels or greater; or the storage tank 62 may include a plurality of separate storage tanks 62a, 62b and 62c. The storage tank 62 could have a capacity over 500 bushels. The air lock 60, and/or any of the feeders 58a-58c, may be integrated with a lid 64 for manually accessing the storage tank 62. The lid 64 may be opened to provide visual inspection of the storage tank 62 and retain the possibility of filling the storage tank 62 manually/conventionally. The feeders 58a-58c and/or the respective air lock 60 may also be manufactured from plastic to reduce weight.

During operation, an air system 66 drives air into the storage tanks 62 to produce a pressure sufficient for field operations. Accordingly, the pressure m the storage tank 62 permits one or more metering boxes 68 to transfer the particulate materials from respective the storage tanks 62 to the ground engaging tool for application at a general transfer rate, such as 2 to 3 particulate materials per second.

In addition, the air cart 50 may include a filling system 70, such as an auger conveyor. Accordingly, the filling system 70 may be deployed to swing into position with a supply vehicle.

In a preferred embodiment, multiple individual storages tanks 62a, 62b and 62c are provided for storing one or more types of particulate materials. Each of the storages tanks 62a, 62b and 62c couple to a respective air lock 60a, 60b and 60c. In turn, each of the air locks 60a. 60b and 60c couple to a respective feeder 58a, 58b and 58c. Accordingly, different types of particulate materials may be deposited into the different storages tanks 62a, 62b and 62c at the same time or at different times. The air system 66 may drive air into the storage tanks 62a, 62b and 62e to produce a pressure sufficient for field operations. Accordingly, the pressure in the tanks 62a, 62b and 62c permits respective metering boxes 68a, 68b and 68e to transfer the particulate materials from respective the storage tanks 62a, 62b and 62c to the ground engaging tool at various times for application.

Figure 4:
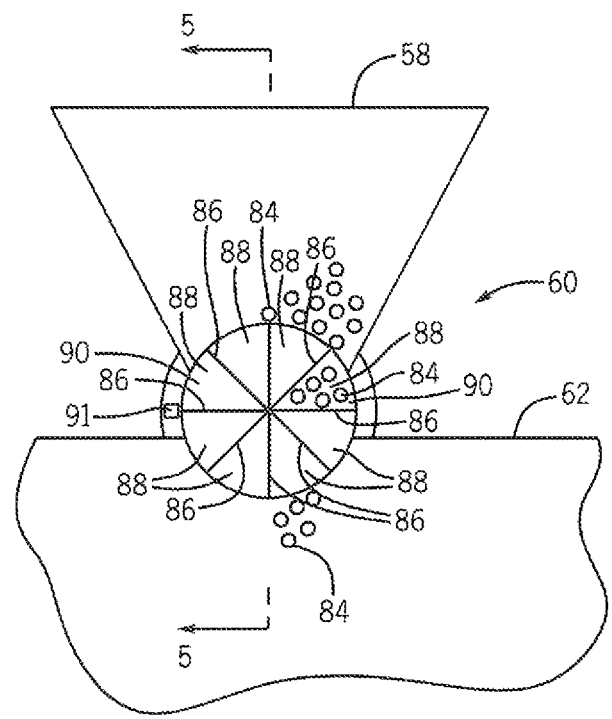
FIG. 4 is a side view of a feeder and a rotary air lock in accordance with an embodiment of the present invention.

Referring now to FIG. 4, a side view of the feeder 58, which is in this example a hopper, and the air lock 60 which is in this example is a rotary air lock, are provided in accordance with an embodiment of the present invention. The feeder 58 has a wider area opening above for catching particulate materials 84 from a filling system. In turn, the particulate materials 84 fall toward the bottom of the feeder 58, and funnel into the rotary air lock 60 positioned below the feeder 58.

Figure 5:
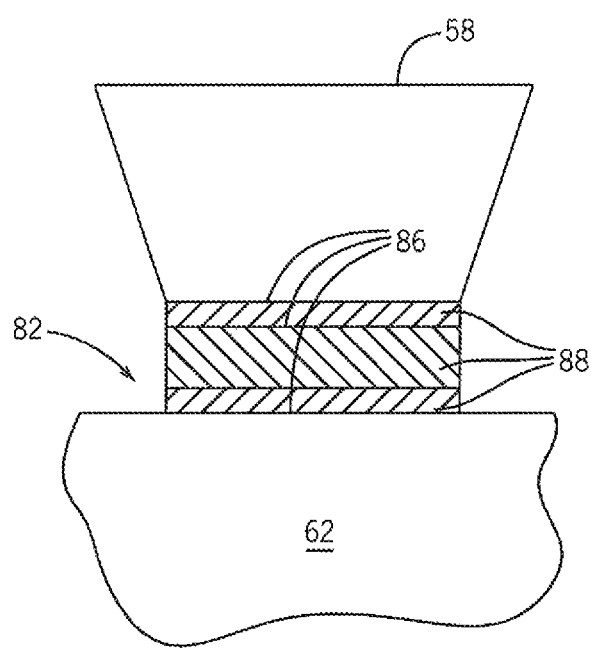
FIG. 5 is a sectional view of the rotary air lock of FIG. 4 taken along the line 5.

The rotary air lock 60 includes a plurality of vanes 86 providing pockets 88 in between the vanes 86 for holding the particulate materials 84. FIG. 5 illustrates a sectional view of the feeder 58 and the rotary air lock 60 of FIG. 4 taken along the line 5-5. In operation, as a pocket 88 facing the feeder 58 fills with the particulate materials 84, the rotary air lock 60 rotates the pocket 88, clockwise or counterclockwise, to a substantially sealed area 90. Then, the rotary air lock 60 rotates the pocket 88 again, such that the pocket 88 then faces a storage tank 62 for transferring the particulate materials 84 into the storage tank 62. The sealed area 90, between the feeder 58 and the storage tank 62, may use an airtight seal or gasket 94, and may include sensing hardware 91, such as a Hall effect sensor, for counting the number of revolutions of the rotary air lock 60 to measure the volume of particulate materials (or product) going to the storage tank 62. As a result, by rotating the pockets 88 to the sealed area 90 first, then to the storage tank 62, a pressure suitable for active field operations can be substantially maintained in the storage tank 62. In addition, the amount of particulate materials (or product) going to the storage tank 62 may be approximately determined.

Figure 6A:
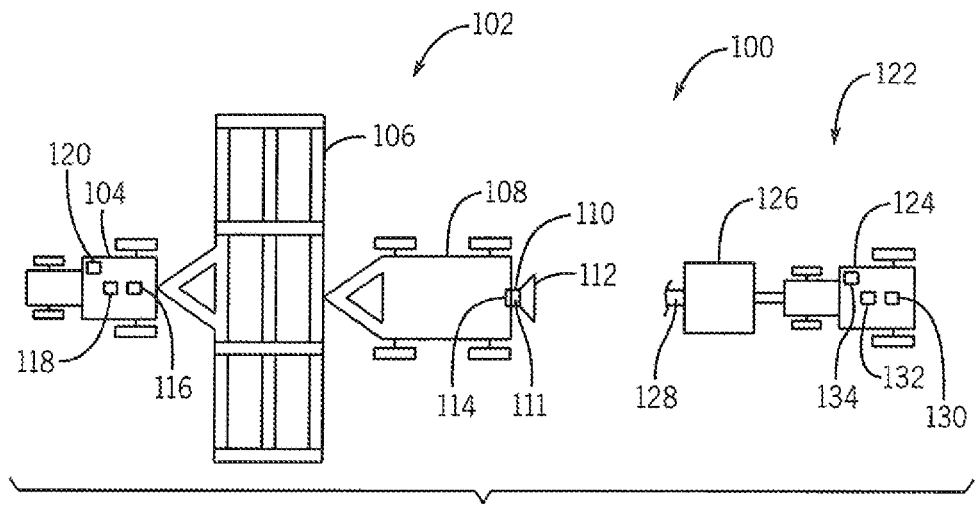
FIG. 6A is a plan view of an exemplar agricultural system before a filling operation.

Referring now to FIG. 6A, a plan view of an exemplar agricultural system 100 before an on-the-go filling operation is provided in accordance with an embodiment of the present invention. The agricultural system 100 includes an air seeding system 102 (or other ground engaging system). The an seeding system 102 may include a tractor 104 (or other vehicle) pulling an air seeder 106 (or other ground engaging tool) and an air cart 108 (or other storage element). While the tractor 104 is moving across a field, the air seeder 106 may continuously deliver an agricultural product comprising particulate materials, such as seeds or fertilizer, to the ground. The agricultural product may be continuously provided by the air cart 108 coupled to the air seeder 106. Alternative embodiments may include an air seeding system 102 (or other ground engaging system) that is further integrated, self-propelled and/or autonomous.

The air cart 108 may also include a filling line 110 connected to a storage tank of the air cart 108, and a drogue 112 or feeder connected to the filling line 110. In an embodiment, the drogue 112 may be a cylindrical or funnel-shaped device held as an access point and target for filling operations. A pump 114 connected to the filling line 110 may facilitate filling the air cart 108 when a filling source provides particulate materials to the drogue 112. The air seeding system 102 may also include a controller 116 that may include a display unit or user interface and a navigation controller, a GPS device 118 that includes an antenna and receiver, and a WCU 120 that can include a power control switch as described above with respect to FIGS. 1 and 2.

In embodiments, the air cart 108 could also have multiple storage tanks, similar to that described with respect to FIG. 3. Accordingly, different types of particulate materials could be received at different drogues or feeders leading to different storage tanks for holding the different types of particulate materials.

The agricultural system 100 also includes a separately operated filling system 122. The filling system 122 may include a supply vehicle 124 (which may be a tractor, truck or other vehicle) and a tank 126 (or trailer or other storage element, which may be front or rear loaded). The tank 126 is filled with an agricultural product to be delivered to the air seeding system 102. The tank 126 could be mounted to and carried by the supply vehicle 124 via a 3 point hitch mount, or have wheels and be pushed by the supply vehicle 124. In some embodiments, such as when the tank 126 is configured with wheels, the tank 126 could be detach (or uncouple) from the supply vehicle 124 and remain coupled/connected to the air seeding system 102 until filling is finished, at which point the tank 126 could be uncoupled/unconnected and left in the field for subsequent pick-up. This could allow the same supply vehicle 124 to deliver other tanks to other air seeding systems. Alternative embodiments may also include a filling system 122 that is further integrated, self-propelled and/or autonomous.

The filling system 122 also includes a probe 128 connected to the tank 126 for accessing the agricultural product in the tank 126 and delivering the agricultural product to air seeding system 102. Accordingly, the probe 128 may couple to the drogue 112 during such filling operations. The filling system 122 may also include a controller 130 that may include a display unit or user interface and a navigation controller, a GPS device 132 that includes an antenna and receiver, and a WCU 134 that can include a power control switch as described above with respect to FIGS. 1 and 2.

The drogue 112 and the probe 128 may also include electrical connections between them. Accordingly, upon coupling of the drogue 112 and the probe 128, data related to the filling operation, including, but not limited to the volume and type of agricultural product being supplied from the tank 126, can automatically be shared.

In operation, the filling system 122 may be wirelessly summoned by the an seeding system 102 horn a distal location, and the filling system 122 may accordingly conic to the air seeding system 102. Once in a proximal location, such as the filling system 122 behind the air seeding system 102 in an "active zone," one system may then initiate control of the other system in a master/slave approach using V2V operation, such as the air seeding system 102 initiating control of the filling system 122. Accordingly, the speed, alignment and direction of travel of one system may be controlled by the other.

Figure 6B:
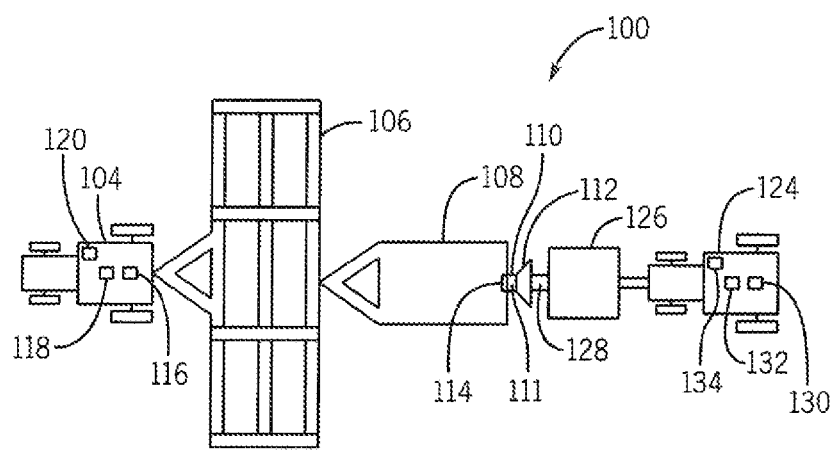
FIG. 6B is a plan view of the exemplar agricultural system during a filling operation.
Figure 6C:
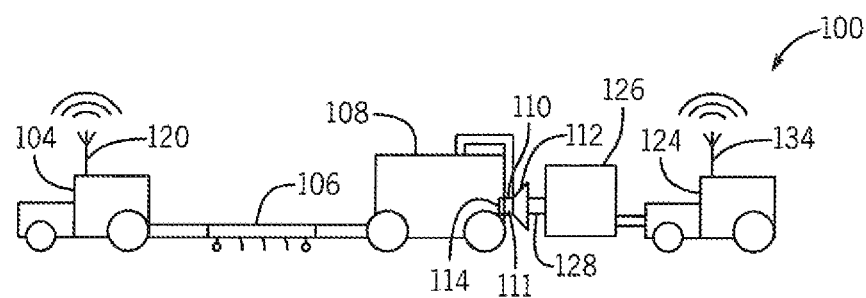
FIG. 6C is a side view of the exemplar agricultural system during a filling operation, each in accordance with an embodiment of the present invention.

As illustrated in FIG. 6B from a plan view, and FIG. 6C from a side view, the air seeding system 102 and the filling system 122 may connect, such as via the probe 128 and the drogue 112, to transfer the agricultural product from the filling system 122 to the air seeding system 102 and to electronically communicate. The probe 110 may integrate an air lock 111, such as a rotary air lock, transfer particulate materials of the agricultural product to the storage tank of the air cart 108 while substantially maintaining a pressure in the storage tank 108. This allows the tank of the air cart 108 to remaining pressurized for field operations during the filling process.

The filling system 122 may stay powered while connected to the air seeding system 102, or can power down while remaining connected to the air seeding system 102. Movements of the filling system 122 can be controlled from the time it enters the field, just when it is in the immediate vicinity of the air seeding system 102, or can remain entirely independent.

Once the filling operation is complete, the air seeding system 102 and the filling system 122 may disconnect, and the filling system 122 may move away from the air seeding system 102 to refill and await the next filling operation.

Certain terminology is used herein for purposes of reference only, and thus is not intended to be limiting. For example, terms such as "upper," "lower," "above," and "below" refer to directions in the drawings to which, reference is made. Terms such as "front," "back," "rear." "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended, to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Many changes and modifications could be made to the invention without departing from the spirit thereof. The scope of these changes will become apparent from the appended claims.

I claim:

1. An agricultural product delivery system comprising:
a feeder for receiving particulate materials;
a storage tank for holding particulate materials;
a rotary air lock coupled between the feeder and the storage tank, and being operable to transfer particulate materials from the feeder to the storage tank while substantially maintaining a pressure in the storage tank, the rotary air lock including a plurality of vanes providing pockets in between for holding particulate materials, wherein rotation of the rotary air lock rotates the pockets from the feeder to a sealed area and from the sealed area to the storage tank such that the particulate materials exit the pockets and fall into the storage tank;
sensing hardware in communication with the sealed area, the sensing hardware being configured to measure a volume of particulate material transferred from the feeder to the storage tank;
a metering box operatively connected to the storage tank and configured to transfer the particulate materials from the storage tank to a ground engaging tool; and
a control system for controlling a tilling system providing particulate materials to the feeder, wherein the control system is configured to communicate with the filling system to substantially maintain an alignment between the filling system and the feeder.

2. The delivery system of claim 1, further comprising a global positioning system (GPS), wherein the control system uses the GPS to substantially maintain the alignment.

3. The delivery system of claim 1, further comprising a wireless communication unit (WCU), wherein the control system wirelessly communicates with the filling system using the WCU.

4. The delivery system of claim 1, wherein the delivery system is an air cart and the storage tank has a capacity over 500 bushels.

5. The delivery system of claim 1, wherein the filling system comprises an auger conveyor.

6. The delivery system of claim 1, wherein the control system controls at least one of a speed and a direction of travel for the filling system.

7. The delivery system of claim 1, wherein the control system is operable to summon the filling system from a distal location and initiate control of the filling system when in a proximal location.

8. The delivery system of claim 1, wherein the feeder comprises at least one of a hopper and a drogue.

9. A method for filling an agricultural product delivery system comprising:
(a) receiving particulate materials at a feeder from a separately operated filling system;
(b) interconnecting the feeder to a storage tank with a rotary air lock, the rotary air lock being operable to transfer particulate materials from the feeder to the storage tank while substantially maintaining a pressure in the storage tank;
(c) holding particulate materials in pockets between a plurality of vanes of the rotatry air lock;
(d) rotating the rotary air lock such that the pockets are moved from a loading position wherein the pockets are in communication with the feeder to a sealed area and from the sealed area to unloading position wherein the pockets are in communication with the storage tank such that the particulate materials exit the pockets and fall into the storage tank;
(e) using a sensing hardware, sensing a volume of particulate material passing through the sealed area from the feeder to the storage tank;
(f) holding particulate materials in a storage tank;
(g) transferring the particulate materials from the storage tank to a ground engaging tool with a metering box operatively connected to the storage tank; and
(h) communicating with and electronically controlling the filling system providing particulate materials to the feeder to substantially maintain an alignment between the filling system and the feeder.

10. The method of claim 9, further comprising using a GPS to substantially maintain the alignment.

11. The method of claim 9, further comprising wirelessly communicating with the filling system using a WCU.

12. The method of claim 9, further comprising controlling at least one of a speed and a direction of travel for the filling system.

13. The method of claim 9, further comprising summoning the filling system from a distal location and initiating control of the filling system when in a proximal location.

14. The method of claim 9, further comprising detaching a tank from the filling system and receiving particulate materials at the feeder from the tank.

15. The method of claim 9, further comprising controlling a general transfer rate of the particulate materials to a ground engaging tool.

16. An agricultural product delivery system comprising:
- a filling system comprising an auger conveyor for providing particulate materials;
- a feeder for receiving particulate materials from the filling system;
- a storage tank for holding particulate materials;
- a rotary air lock coupled between the feeder and the storage tank, and being is operable to transfer particulate materials from the feeder to the storage tank while substantially maintaining a pressure in the storage tank, the rotary air lock including a plurality of vanes providing pockets in between for holding particulate materials, wherein rotation of the rotary air lock rotates the pockets from the feeder to a sealed area and from the sealed area to the storage tank such that the particulate materials exit the pockets and fall into the storage tank;
- sensing hardware in communication with the sealed area, the sensing hardware being configured to measure a volume of particulate material transferred from the feeder to the storage tank;
- a metering box operatively connected to the storage tank and configured to transfer the particulate materials from the storage tank to a ground engaging tool; and
- a control system for controlling the filling system providing the particulate materials to the feeder, wherein the control system is configured to communicate with the filling system to substantially maintain an alignment between the filling system and the feeder.

\* \* \* \* \*